United States Patent
Shainski et al.

(10) Patent No.: US 11,038,672 B2
(45) Date of Patent: Jun. 15, 2021

(54) SECURE AND DISTRIBUTED MANAGEMENT OF A PROXY RE-ENCRYPTION KEY LEDGER

(71) Applicant: Duality Technologies, Inc., Maplewood, NJ (US)

(72) Inventors: Arina Shainski, Ramat Hasharon (IL); Kurt Rohloff, West Orange, NJ (US)

(73) Assignee: DUALITY TECHNOLOGIES, INC., Maplewood, NJ (US)

(*) Notice: Subject to any disclaimer, the term of this patent is extended or adjusted under 35 U.S.C. 154(b) by 259 days.

(21) Appl. No.: 16/429,530

(22) Filed: Jun. 3, 2019

(65) Prior Publication Data

US 2019/0372762 A1 Dec. 5, 2019

Related U.S. Application Data

(60) Provisional application No. 62/679,120, filed on Jun. 1, 2018.

(51) Int. Cl.
| | | |
|---|---|---|
| H04L 9/08 | (2006.01) | |
| G06F 16/182 | (2019.01) | |
| H04L 9/06 | (2006.01) | |
| G06F 21/62 | (2013.01) | |
| G06F 21/64 | (2013.01) | |
| H04L 9/00 | (2006.01) | |

(Continued)

(52) U.S. Cl.
CPC ........ H04L 9/0819 (2013.01); G06F 16/1824 (2019.01); G06F 16/1834 (2019.01); H04L 9/0643 (2013.01); H04L 2209/38 (2013.01); H04L 2209/76 (2013.01)

(58) Field of Classification Search
CPC . H04L 9/0819; H04L 9/0643; H04L 2209/76; H04L 2209/38; H04L 9/008; H04L 9/0894; H04L 9/3239; G06F 16/1824; G06F 16/1834; G06F 21/6227; G06F 21/64; G06F 16/137
See application file for complete search history.

(56) References Cited

U.S. PATENT DOCUMENTS

| | | | |
|---|---|---|---|
| 2002/0019932 A1* | 2/2002 | Toh ........................ | H04L 63/062 713/155 |
| 2008/0212770 A1* | 9/2008 | Satou ..................... | H04L 9/0637 380/44 |
| 2017/0155628 A1 | 6/2017 | Rohloff et al. | |

(Continued)

*Primary Examiner* — Darren B Schwartz
(74) *Attorney, Agent, or Firm* — Pearl Cohen Zedek Latzer Baratz LLP (57) ABSTRACT

A device, system, and method for decentralized management of a distributed proxy re-encryption key ledger by multiple devices in a distributed peer-to-peer network. A network device may receive shared data defining access to a proxy re-encryption key. The network device may locally generate a hash code based on the shared data. The network device may receive a plurality of hash codes generated based on versions of the shared data at a respective plurality of the other devices in the network. If the locally generated hash code matches the received plurality of hash codes, the network device may validate that the shared data is the same across the network devices and may add the received proxy re-encryption key access data and locally generated hash code to a local copy of the distributed proxy re-encryption key ledger.

18 Claims, 10 Drawing Sheets

(51) Int. Cl.
*H04L 9/32* (2006.01)
*G06F 16/13* (2019.01)

(56) References Cited

U.S. PATENT DOCUMENTS

| | | |
|---|---|---|
| 2018/0349577 A1 | 12/2018 | Goldwasser et al. |
| 2019/0028277 A1* | 1/2019 | Jayachandran ......... H04L 9/085 |
| 2019/0372762 A1 | 12/2019 | Shainski et al. |
| 2020/0036512 A1 | 1/2020 | Vaikuntanathan et al. |
| 2020/0151356 A1 | 5/2020 | Rohloff et al. |
| 2020/0228308 A1 | 7/2020 | Shainski et al. |

* cited by examiner

SECURE AND DISTRIBUTED MANAGEMENT OF A PROXY RE-ENCRYPTION KEY LEDGER

CROSS-REFERENCE TO RELATED APPLICATIONS

This application claims the benefit of U.S. Provisional Application Ser. No. 62/679,120, filed Jun. 1, 2018, which is hereby incorporated by reference in its entirety.

FIELD OF THE INVENTION

Embodiments of the invention are directed to the field of encryption, decryption and re-encryption, and in particular, to proxy re-encryption. Embodiments of the invention include systems and methods to encrypt secret data to share with an external or third party in a manner that is both secure and decentralized.

BACKGROUND OF THE INVENTION

Today, massive amounts of data live in many organizations, with barriers between them, erected by mistrust, economic incentives and regulatory hurdles. When secret data, such as, personal or medical data is involved, privacy becomes a major concern for all parties involved, as that information can be used to identify or exploit the individuals.

To encourage collaboration, while still protecting data secrecy, Proxy Re-Encryption (PRE) cryptosystems have been developed that allow parties to transform data encrypted in one key to data encrypted in another key. PRE cryptosystems swap the keys that encrypt secret data without exposing (decrypting) the underlying secret data. PRE cryptosystems use embedded PRE keys (e.g., PRE Key=Public Key B(Private Key A)) to switch from encrypting secret data using User A's key (e.g., Public Key A(secret data)) to User B's key (e.g., Public Key B(secret data)). By swapping keys, PRE cryptosystems allow secret data to be passed securely from user-to-user, where each user holds a secret private key to a different encryption scheme.

Because each PRE key is generated using an exposed (unencrypted) private, i.e., secret, key (e.g., Private Key A), generally PRE keys are generated and managed by a secure centralized key management authority to bolster trust and security. However, centralizing key management has disadvantages, such as decreased efficiency created by a bottleneck in processing burden at the central authority, communication bandwidth issues caused by all parties attempting to communicate with a central server, and risk of a fatal data breach if security at the central authority is compromised.

Attempts to decentralize PRE management, however, has its own disadvantages. Decentralized PRE keys are generated sequentially by a chain of key swaps, from peer-to-peer. Accordingly, the integrity of the entire chain of PRE keys is only as strong as the integrity of the weakest link in the peer-to-peer chain. For example, a single insecure party can compromise the security of the entire PRE system downstream of that party. Further, faulty keys in such peer-to-peer implementations are difficult to track and correct, because parties can obfuscate their identities and are difficult to locate in a decentralized party structure.

Accordingly, there is a need in the art for a PRE cryptosystem to distribute PRE keys in a manner that is both decentralized and secure.

SUMMARY OF EMBODIMENTS OF THE INVENTION

According to an embodiment of the invention, a device, system and method is provided to resolve the aforementioned longstanding problems inherent in the art by providing a decentralized ledger for logging the use of Proxy Re-Encryption (PRE) keys that is managed by a decentralized network of peer-to-peer nodes. The network of peer-to-peer nodes collectively update and validate the ledger entries (e.g., by cross-checking hash codes) to provide a distributed solution to PRE key management that is both efficient (e.g., distributing computations across multiple peer devices in the network, avoiding computing and bandwidth bottlenecks associated with centralized management), fault resilient (e.g., resistant to take-down by a security breach at a single fault point), and secure (e.g., the multiple peer devices in the network cross-check and co-validate each other's PRE key data to give confidence that, in cooperation, their aggregate behavior is trusted).

In accordance with an embodiment of the invention, a device, system and method is provided for decentralized management of a distributed proxy re-encryption key ledger by multiple devices in a distributed peer-to-peer network. A network device in the distributed peer-to-peer network may receive data defining access to a proxy re-encryption key configured to simultaneously switch encryption keys by adding a second encryption key and cancelling a first encryption key to transform secret data from being encrypted by the first encryption key to being encrypted by the second encryption key, without decrypting the secret data. The network device may locally generate a hash code based on the received proxy re-encryption key access data. The network device may receive a plurality of hash codes generated based on a respective plurality of proxy re-encryption key access data received at a respective plurality of the other devices in the network. If the locally generated hash code matches the received plurality of hash codes, the network device may validate that the received proxy re-encryption key access data is the same as each of the plurality of proxy re-encryption key access data. Upon validating the received proxy re-encryption key access data, the network device may add the received proxy re-encryption key access data and locally generated hash code to a copy of the distributed proxy re-encryption key ledger stored at the network device substantially simultaneously to the plurality of proxy re-encryption key access data and hash codes being redundantly added to a respective plurality of copies of the distributed proxy re-encryption key ledger stored across a respective plurality of the other devices in the network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Decentralizing Proxy Re-Encryption (PRE) key management via a peer-to-peer system is conventionally avoided because it is considered too insecure and vulnerable to malicious parties. Accordingly, PRE keys are conventionally managed by a trusted centralized authority. On the other hand, centralized key management is associated with inefficient processing and single-point fault risk.

Accordingly, a system, device, and method is provided according to embodiments of the invention for secure Proxy Re-Encryption (PRE) by managing a distributed PRE key ledger in a manner that is both secure (e.g., by network-wide redundant cross-verification of a shared ledger) and decentralized (e.g., to increase computing speed and efficiency by avoiding computing bottlenecks at a centralized server, and to bolster resilience to system failure by avoiding risks of centralized server failure or security breach).

Proxy re-encryption reassigns data access to new parties by swapping keys form an old party's key to a new party's key. For sensitive, secret or proprietary data, it is important to track access to PRE keys, to protect the data and monitor its usage. The PRE key ledger allows the system to track which parties delegate access to which other parties by distributing PRE keys, thus allowing the system to identify data access and hold accountable malicious parties. The PRE key ledger may comprise one or more PRE keys and/or one or more PRE key access entries documenting which device(s) access which PRE key(s). In various embodiments, a same or separate ledger may be used for each of the encrypted data files, the PRE keys, and/or access records for the encrypted data files and/or PRE keys.

The distributed PRE key ledger is secure. Each new data entry is validated across the network before its added to the distributed PRE key ledger. The new data is distributed across the network to multiple devices, each of which locally generate a hash code based on the new data. Each device then broadcasts to other network devices, and receives from other network devices, their respective hash code associated with the new data. If the hash codes match at some, an above threshold number or proportion, or all of the other devices, the new data is validated as the same across the network. Once the new data is validated, each of a plurality or all network devices may add the new data and its corresponding hash code to their respective copy of the distributed PRE key ledger. In one embodiment shown in FIG. 1B, a sequence of data block entries are linked by a sequence of hash codes, where each hash code is generated based on each corresponding pair of adjoining data block entries. To download data from the ledger, each data block entry may be validated by re-generating the associated hash code and comparing it to the stored hash code in the ledger.

The security of the PRE key ledger is collectivized. Conventional peer-to-peer systems are untrusted because individual peers are inherently insecure. Embodiments of the invention overcome this problem inherent to peer-to-peer structures by establishing a collective trust. That is, the distributed PRE key ledger is replicated and cross-validated across many peer-to-peer devices in the network to give confidence that, in coordination, the aggregate ledger data shared across the network of devices is trusted. The ledger is redundantly stored at multiple peer devices, such that each time an entry is added to the ledger, a plurality (all or a subset) of the peer device simultaneously update their copy of the shared ledger with the new entry and hash code generated based on the new entry. Peer devices that add new entries to the ledgers and/or download entries from the ledgers, cross-check the hashes across the plurality of network devices. If any (or an above threshold amount) of the hashes do not match, the entry, ledger or party associated with the non-matching hash code is identified as potentially malicious. Only majority (or above threshold) consensus behavior is accepted, forcing malicious behavior to be rejected. Because the distributed PRE key ledger is redundantly stored across the network, the ledger cannot be corrupted at a single point of failure. If a single ledger or entry is corrupted by an individual malicious peer, it will not be validated by the other network peers, and that file may be identified as corrupt and eliminated. Thus, even though each peer is untrusted alone, the group of peers work together, in concert, to collectivize trusted behavior. Thus, embodiments of the invention provide a peer-to-peer PRE cryptosystem that is decentralized and secure.

Figure 1A:
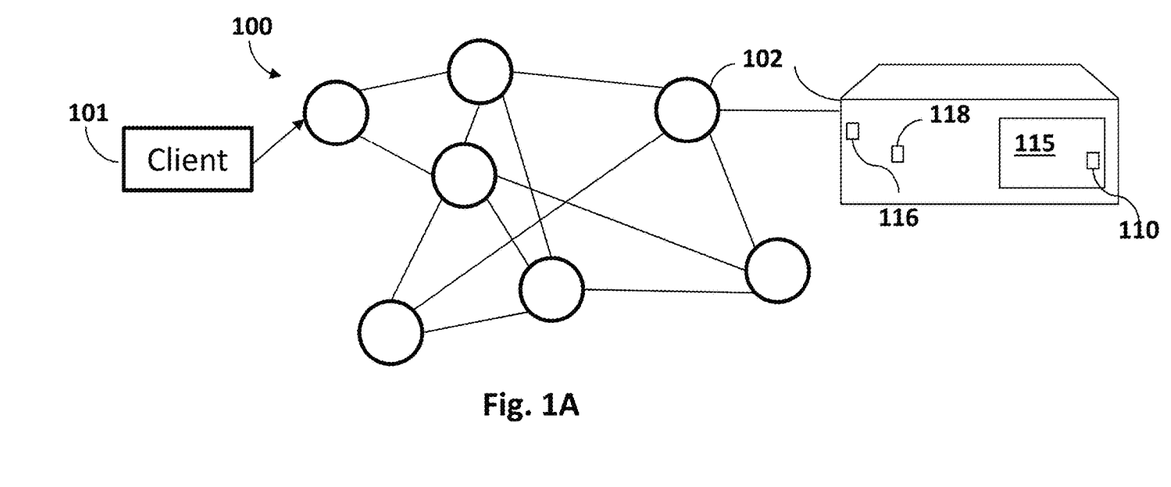
FIG. 1A is a schematic illustration of a peer-to-peer network for decentralized management of a distributed proxy re-encryption key ledger, in accordance with an embodiment of the invention.

Reference is made to FIG. 1A, which is a schematic illustration of a peer-to-peer network 100 for decentralized management of a distributed proxy re-encryption key ledger 110, in accordance with an embodiment of the invention.

Peer-to-peer network 100 comprises a plurality of network nodes that are individual peer devices 102. Each peer device 102 is an independent user or computing system having a distinct identity and/or authentication credentials. Each peer device 102 has one or more controller(s) or processor(s) 116 for executing operations according to embodiments of the invention and one or more memory unit(s) 118 and/or 115 for storing data (e.g., encryption, decryption, and/or PRE keys, data that is encrypted, decrypted or re-encrypted, and hash codes), a local copy of the distributed proxy re-encryption key ledger 110, and/or instructions (e.g., software for applying keys to encrypt, decrypt or re-encrypt data, and hashing data, according to embodiments of the invention) executable by the processor(s). Processor(s) 116 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118 and/or 115 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Peer devices 102 in network 100 may be connected by any public or private network such as the Internet. Access to network 100 may be through wire line, terrestrial wireless, satellite or other systems well known in the art.

Each peer device 102 has one or more distinct associated pairs of public (encryption) and private (decryption) keys. Each peer device 102 may share its public (encryption) key with other devices inside and/or outside of the network 100, but does not share its private (decryption) key with any other device inside or outside of the network 100. In this way, secret data encrypted by each peer device's 102 public (encryption) key can not be decrypted by another device to expose the underlying secret data.

Figure 2:
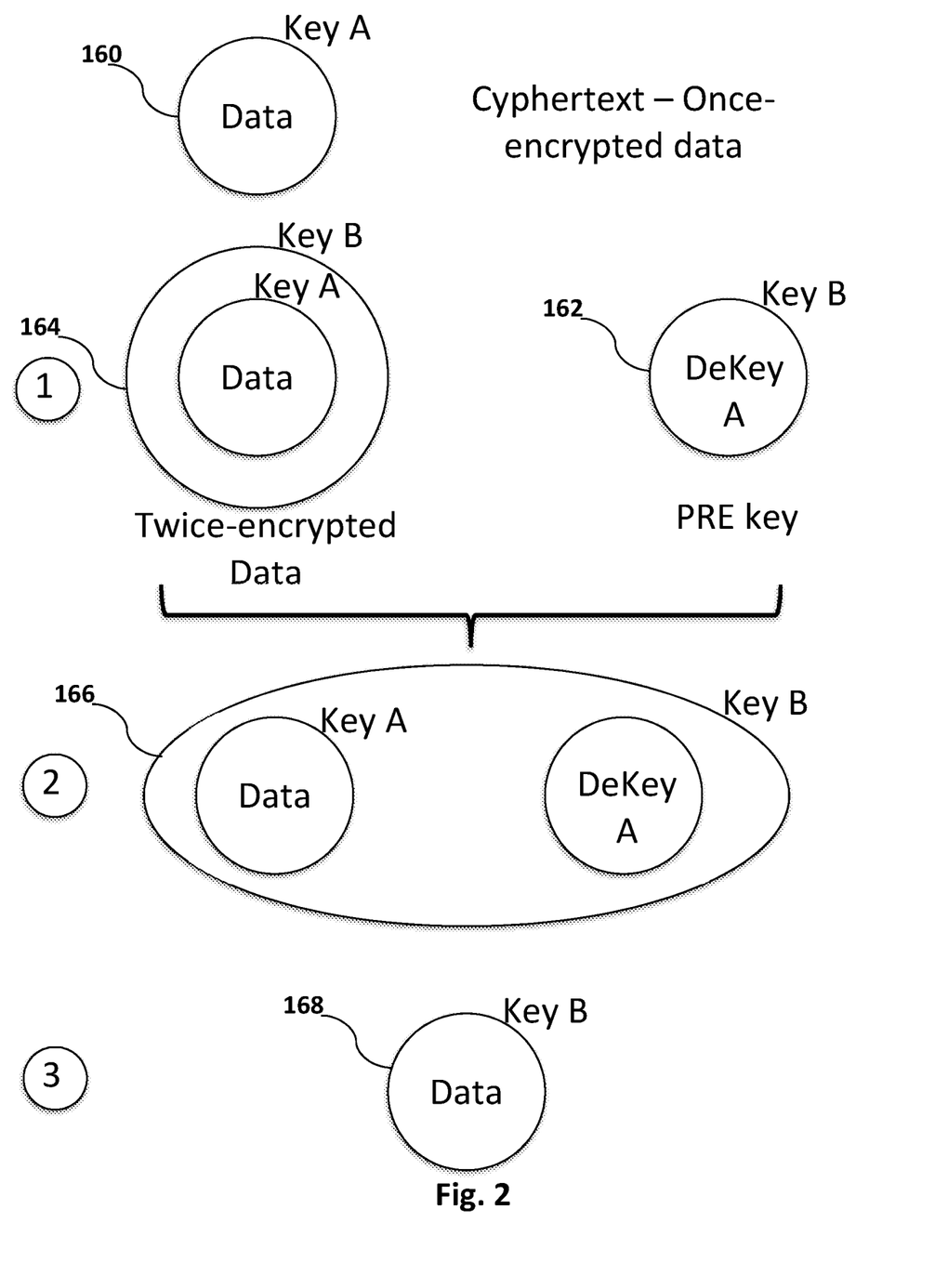
FIG. 2 is a schematic illustration of data structures used for proxy re-encryption (PRE), in accordance with an embodiment of the invention.

Access to the secret data can only be shared between peer devices 102 in an encrypted format via proxy re-encryption, for example, as described in reference to FIG. 2. In proxy re-encryption, data encrypted by a first peer device's 102 public encryption key is re-encrypted using a proxy re-encryption key (e.g., 162 of FIG. 2) to simultaneously switch encryption keys by adding a second peer device's 102 public encryption key and cancelling the first peer device's 102 public encryption key. The secret data is thus transformed from being encrypted by the first peer device's 102 encryption key to being encrypted by the second peer device's 102 encryption key, without ever decrypting or exposing the secret data in unencrypted form.

Peer-to-peer network 100 collectively, via a plurality of peer devices 102, manages a distributed proxy re-encryption key ledger 110. A client 101 may upload or download data stored in the distributed proxy re-encryption key ledger 110 from one or more peer devices 102. The uploaded or downloaded data may include:

1. Encrypted Digital data files (e.g., digital vcf files): These files may contain secret or private data, such as medical or security information. Peer-to-peer network 100 tracks who has access to these files.
2. Proxy Re-Encryption Keys: These keys enable access to the encrypted files to be delegated from one user to another.

Distributed proxy re-encryption key ledger 110 may comprise log entries that define user access to proxy re-encryption keys, such as, which user (e.g., identified by user ID) downloaded or uploaded a particular PRE key (e.g., identified by PRE key reference number or ledger location). In some embodiments, distributed proxy re-encryption key ledger 110 may also store one or more of the proxy re-encryption keys and/or the encrypted data files in the same or separate ledger(s) as the access log ledger 110. Storing the PRE keys and digital files in a distributed proxy re-encryption key ledger 110 may collectively validate that the PRE keys and encrypted files came from a specific source, have not been tampered with and are always available, e.g., even if the source fails or exits the network. In addition, storing the PRE keys and digital files in a distributed proxy re-encryption key ledger 110 gives a level of assurance that access to the PRE keys and files by approved recipients can not be removed once the encrypted files and proxy re-encryption keys are uploaded to the network 100.

A peer device 102 may be the source of a data asset encrypted with the source's public key. The source peer device 102 may generate a PRE key that has the source's private decryption key and a public encryption key of another peer device 102 that is the asset recipient. The PRE key may then be used to delegate access to the recipient user for any information encrypted by the source's encryption key. To track who has access to the source's data, network 100 may log who is accessing the PRE keys and/or the digital files in the proxy re-encryption key ledger 110. By storing the digital files and/or PRE keys in the proxy re-encryption key ledger 110, network 100 tracks which users delegate access, which users receive access, and which PRE keys and/or encrypted files are accessed.

Figure 9:
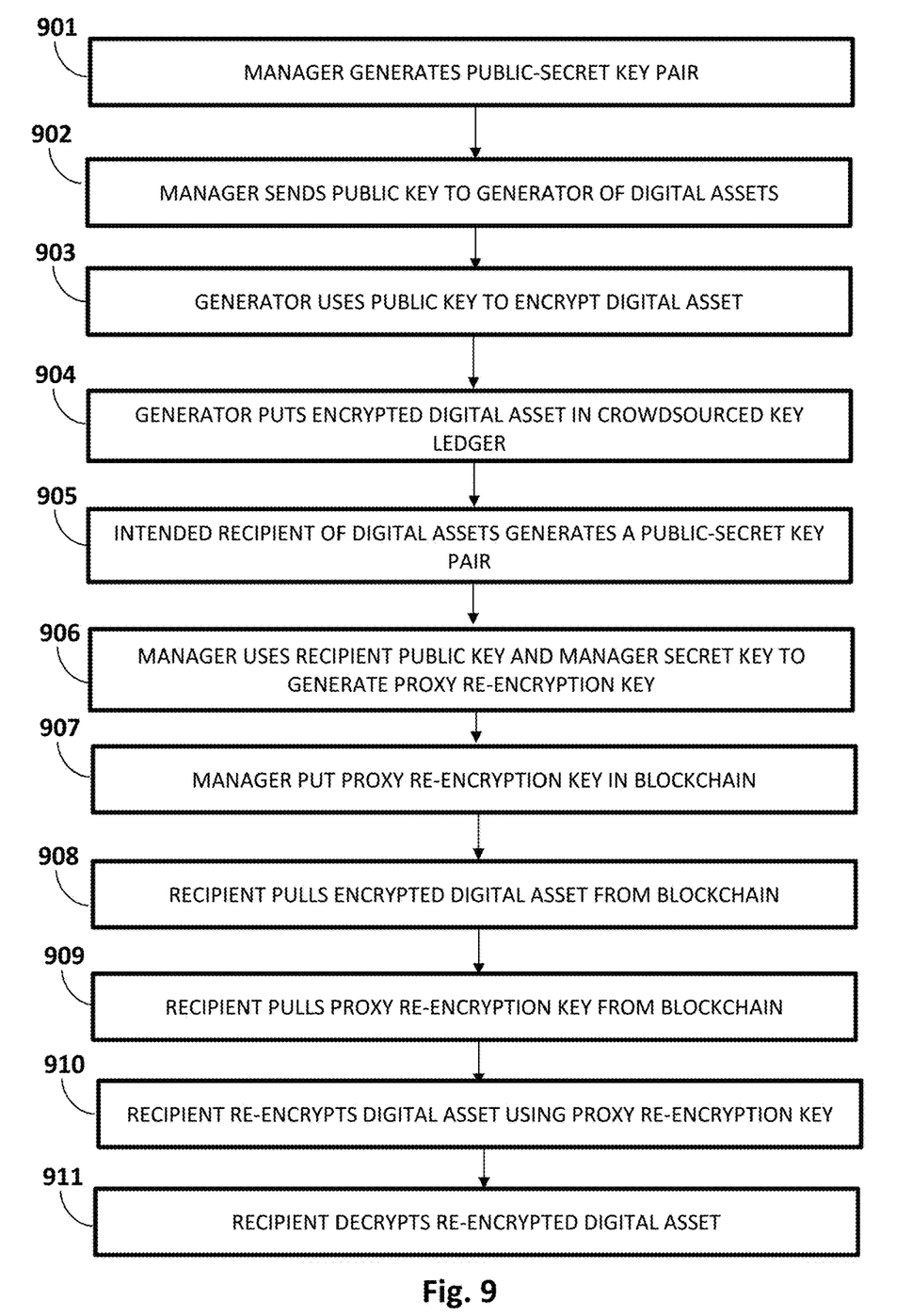
FIG. 9 is a flowchart of a method for devices in a peer-to-peer network to collaboratively manage a distributed proxy re-encryption key ledger, in accordance with some embodiments of the invention.

Each peer device 102 in network 100 may be used by parties including a manager of the digital file or asset, a PRE key generator, a recipient of the encrypted digital file or asset and/or one or more third parties, all of which may upload or download data to the proxy re-encryption key ledger 110, for example, described in reference to FIG. 9.

Reference is made to FIG. 9, which is a flowchart of a method for devices in a peer-to-peer network to collaboratively manage a distributed proxy re-encryption key ledger, in accordance with some embodiments of the invention. Devices in FIG. 9 may be the same or different as those described in reference to FIG. 1A.

In operation 901, a first peer device (e.g., 102 or FIG. 1A) (e.g., a manager of a digital asset) generates a first key pair comprising a first public key and a first secret key.

In operation 902, the first peer device sends a generator of a digital asset (the same or different peer device 102 as the manager) the first public key.

In operation 903, the generator peer device (e.g., 102 or FIG. 1A) uses the first public key to encrypt the digital asset.

In operation 904, the generator adds the encrypted digital asset to a distributed ledger 110 stored at a plurality (all or a subset) of peer devices on the network (e.g., 100 or FIG. 1A). Once validated across the network, the digital asset is added to the distributed ledger (e.g., 110 or FIG. 1A) as a new entry, together with a new hash code generated based on the digital asset.

In operation 905, a second peer device (e.g., 102 or FIG. 1A) that is an intended recipient of the digital asset, generates a second key pair comprising a second public key and a second secret key. The second peer device sends the first peer device the second public key.

In operation 906, the first peer device uses the second public key and the first secret key to generate a proxy re-encryption key.

In operation 907, the first peer device adds the proxy re-encryption key to the same or different distributed ledger (e.g., 110 or FIG. 1A). The proxy re-encryption key is stored at a plurality (all or a subset) of peer devices on the network. Once validated across the network, the digital asset is added to the distributed ledger as a new entry, together with a hash code generated based on the digital asset.

In operation 908, the second peer device downloads the encrypted digital asset and associated hash code from the distributed ledger stored at one or more peer devices on the network. In one embodiment, the second peer device transmits a reference code that identifies the requested digital asset to the network, and or more peer devices that store the associated data and/or ledger may broadcast the data to the second peer device. The second peer device may verify the authenticity of the encrypted digital asset by rehashing the downloaded encrypted digital asset and comparing it to the downloaded hash code from the one or more of the plurality of devices. A new ledger entry and associated hash code may be added to ledger to record the download.

In operation 909, the second peer device downloads the proxy re-encryption key from the distributed ledger stored at one or more of peer devices on the network. In one embodiment, the second peer device transmits a reference code that identifies the requested proxy re-encryption key to the network, and the one or more peer devices that store the associated data and/or ledger may broadcast the data to the second peer device. The second peer device may verify the authenticity of the proxy re-encryption key by rehashing the downloaded proxy re-encryption encryption key and comparing it to the downloaded hash code from the one or more peer devices. A new ledger entry and associated hash code may be added to ledger to record the download.

In operation 910, the second peer device re-encrypts the digital asset using the verified downloaded proxy re-encryption key.

In operation 911, the second peer device decrypts the re-encrypted digital asset using its second private key to access the unencrypted digital asset data.

Figure 1B:
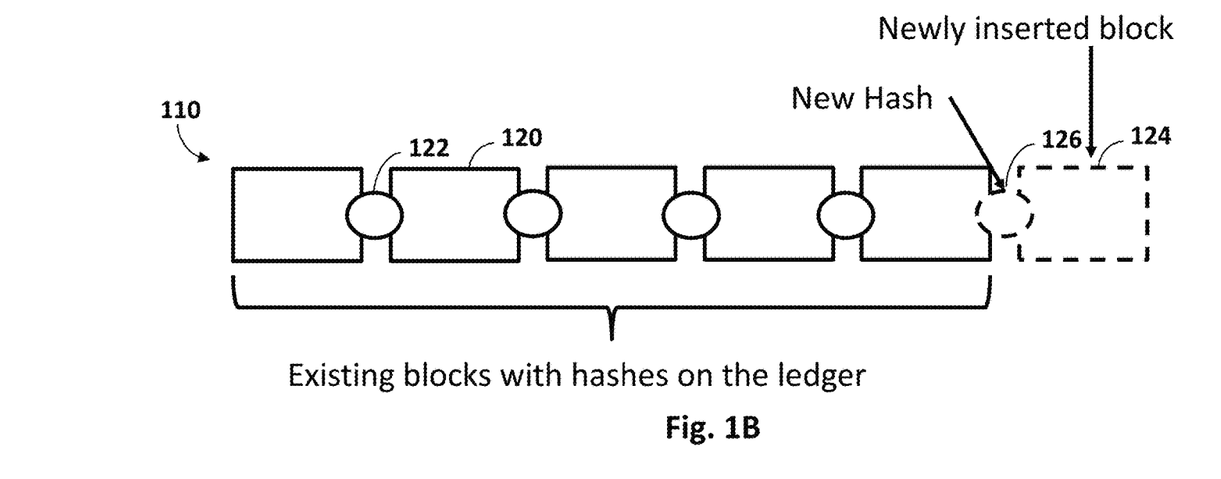
FIG. 1B is a schematic illustration of a distributed proxy re-encryption key ledger, in accordance with an embodiment of the invention.

In operations 904, 907, 908 and/or 909, when new data is added to the proxy re-encryption key ledger, the data may be configured as ledger data entries or data blocks. As shown in FIG. 1B, when a new data entry 124 is inserted into the proxy re-encryption key ledger 110, a cryptographic hash 126 is generated based on the new data entry 124 and the previous data entry 122 at the end of the chain. This hash 126 is then inserted at the end of the chain adjacent to the new data entry 124.

In operations 908-910, alternatively or additionally, any third party may download the proxy re-encryption key and encrypted digital asset from the distributed ledger and then perform re-encryption. A third party could then send the re-encrypted digital asset to the second peer device 102 or another recipient.

Reference is made to FIG. 1B, which is a schematic illustration of a proxy re-encryption key ledger 110, in accordance with an embodiment of the invention. Proxy re-encryption key ledger 110 may comprise a plurality of data entries 120 and associated hash codes 122. Data entries 120 may include encrypted data, PRE keys, and/or access records of the encrypted data and/or PRE keys.

In the example of FIG. 1B, proxy re-encryption key ledger 110 comprises a chain of a plurality of data entry blocks 120 linked by a plurality of cryptographic hash codes 122 generated by hashing one or more of the linked blocks 120. A new data block 124 may be added and a corresponding new hash code 126 may be generated based on the newly added data block 124 and at least one prior data block 120 (e.g., the single prior block, a sequence of up to a predetermined number of N prior blocks, or all prior blocks in the chain).

When a data entry block 120 is downloaded from the proxy re-encryption key ledger 110, its associated hash code 122 is used to verify the validity of the downloaded data. The new data block 124 and hash code 126 are uploaded to, or downloaded from, the distributed proxy re-encryption key ledger 110 in duplicate, e.g., to a plurality of peer device 102 in the network 100 to establish collective trust. A record of the upload or download may also be added as a new data access entry to the same or different proxy re-encryption key ledger 110 on a plurality of peer device 102 in the network 100.

As used herein, a "distributed ledger" may refer to any data structure that stores data that is accessible and collaboratively editable by multiple decentralized computing nodes (e.g., peer devices 102). Examples of distributed ledgers include blockchains, shared documents, tables (individual or embedded), data sequences, etc., which may be stored, edited, and operated concurrently on the multiple decentralized computing nodes.

Distributed proxy re-encryption key ledger 110 is a peer-to-peer information system, such that data uploaded to the ledger stored in one network node is distributed to a matching or shared ledger in many other network nodes. When a new hash code 126 and new data block 124 are uploaded to the proxy re-encryption key ledger 110, that upload is distributed and duplicated over many peer devices 102 in the network 100. To download a data block 122 from the proxy re-encryption key ledger 110, a client 101 pulls information from a local node 102 in the network 100, which then peer-to-peer queries the distributed proxy re-encryption key ledger 110.

Reference is made to FIG. 2, which schematically illustrates data structures used for proxy re-encryption (PRE), in accordance with an embodiment of the invention. Proxy re-encryption is a multi-layered encryption scheme using a proxy re-encryption key to switch or swap encryption (e.g., public) keys, without decrypting or exposing the underlying data. Proxy re-encryption may switch encryption keys, for example, from a first encryption key A assigned to a first peer device A 102 to a second encryption key B assigned to a second peer device B 102. The first encryption key A may be decrypted only by a first decryption DeKey A and the second encryption key B may be decrypted only by a second decryption DeKey B. Encryption keys are public keys and decryption keys are private keys. Only a peer device 102 may obtain the private decryption key assigned to that peer device 102.

A second peer device B 102 may request access to a first peer device A's 102 data.

The first user A (e.g., a first peer device 102 of FIG. 1A) may encrypt the requested original (unencrypted) input data using a first (e.g., public) encryption key A to generate first encrypted data 160.

The first user A obtains a second (e.g., public) encryption key B from the second user B (e.g., a second peer device 102 of FIG. 1A).

The first user A may generate a re-encryption key 162 as a combination of the second (e.g., public) encryption key B and the first (e.g., private) decryption DeKey A (or functions thereof). In one embodiment, the proxy re-encryption key 162 is the first decryption DeKey A encrypted by the second encryption key B One or more processors (e.g., 116 of peer A device 102 of FIG. 1A) may re-encrypt first encrypted data 160 to switch (e.g., public) encryption keys from first key encryption A (in first encrypted data 160) to second encryption key B (in second encrypted data 168). To achieve this key swap from A to B, re-encryption may include some or all of the following steps performed simultaneously or sequentially:

(1) Add the second (e.g., public) encryption key B to encrypt the first encrypted data 160 to generate twice-encrypted data 164 and receive the re-encryption key 162 from the first user.

(2) Merge the proxy re-encryption key 162 and twice-encrypted data 164 as a combined data structure 166 of first encrypted data and first decryption key A, collectively encrypted under a common encryption layer by the same second encryption key B.

(3) Under the common encryption layer of the second encryption key B in combined data structure 166, cancel the first encryption key A by decrypting the first encrypted data using the first decryption DeKey A, to generate second encrypted data 168 that is encrypted only by the second encryption key B.

All data structures 160-168 involved in all steps of proxy re-encryption are encrypted by one or more keys (e.g., key A, DeKey A, key B, DeKey B, or a combination of keys or DeKeys A and B) so that the underlying data is never completely unencrypted or exposed during the proxy re-encryption process. If a malicious party obtains the proxy re-encryption key, there is no direct threat, because the proxy re-encryption key cannot unencrypt the initial data.

After re-encryption, the proxy server may send second encrypted data 168 to the second user (e.g., a second peer device 102 of FIG. 1A). The first user may be the sole device in the system that possesses the first (e.g., private) decryption key A, and thus may be the sole device that can decrypt the first encrypted data 160. The second user may be the sole device in the system that possesses the second (e.g., private) decryption key B, and thus may be the sole device that can decrypt the second encrypted data 168. Since the first peer device A 102 generates the PRE key, it is the only device that has access to the (e.g., private) decryption key A (DeKey A) used to re-encrypt the data.

After PRE key switches keys from A to B, the PRE chain may continue by generating a second PRE key to swap keys from user B to C, and so on. This generates a chain of PRE keys and associated access to a plurality of devices. This chain of keys and/or accesses may be stored in the PRE key ledger (e.g., as shown in FIG. 1B).

Embodiments of the invention provide a system, device and method for the secure sharing of information where access to the shared information is limited to specifically identified individuals and a record is maintained of who accesses the information in a distributed proxy re-encryption key ledger. The technique specifically provides a method to encrypt information and the policy enforcement of limited access delegation is cryptographically enforced by Proxy-Re-Encryption (PRE) techniques, for example, as disclosed in US Patent Application Publication No. 2017/0155628, the entirety of which is hereby incorporated by reference. The record/ledger of information access is cryptographically enforced by peer-to-peer technologies. The PRE capability is also compatible with more generic homomorphic encryption capabilities to enable computations on the data.

Embodiments of the invention provide secure data environment for proxy-re-encryption management; using the proposed system, the secure data and its access may be managed by applying homomorphic encryption to the sensitive data while the transaction record/ledger is recorded on the distributed proxy re-encryption key ledger. The proposed system enables a zero-trust data assets marketplace, in which the members do not need to trust the data managing agent. It is by the collective sharing data that collective trust is established.

Secure data management operations may include:
Generate access delegation keys
Secure access delegation by data seller to data buyer
The access delegation is performed by an untrusted data managing agent running on untrusted cloud network (e.g., 100 of FIG. 1A).
Data delegation transactions are recorded on the corresponding distributed proxy re-encryption key ledger, thus managing attribution and compensation for purchase and/or use of data assets.
Secure condition evaluations: While the sensitive data is homomorphically encrypted and managed by the untrusted cloud network, the cloud network can also evaluate conditions on the encrypted data, which in turn may trigger execution of access delegation transactions and recording those transactions on the corresponding distributed proxy re-encryption key ledger.
The data and/or related access or transactions may be recorded on the corresponding distributed proxy re-encryption key ledger, triggered by condition evaluation by the untrusted cloud network on encrypted sensitive data.

An example application provides recorded access to sensitive genomic data assets including, for example:
Wallet-ID—unique anonymous ID of each network member; and
Genomic data of network members that have their DNA sequenced and/or other healthcare data recorded, for example, in variants files of various formats (e.g., Variant Call Format (VCF), etc.).

Embodiments of the invention provide a system that manages an anonymous, secure genomic data marketplace, e.g., hosted on an untrusted cloud network, with a decentralized proxy re-encryption key ledger, e.g., as discussed in reference to FIGS. 3-8.

Figure 3:
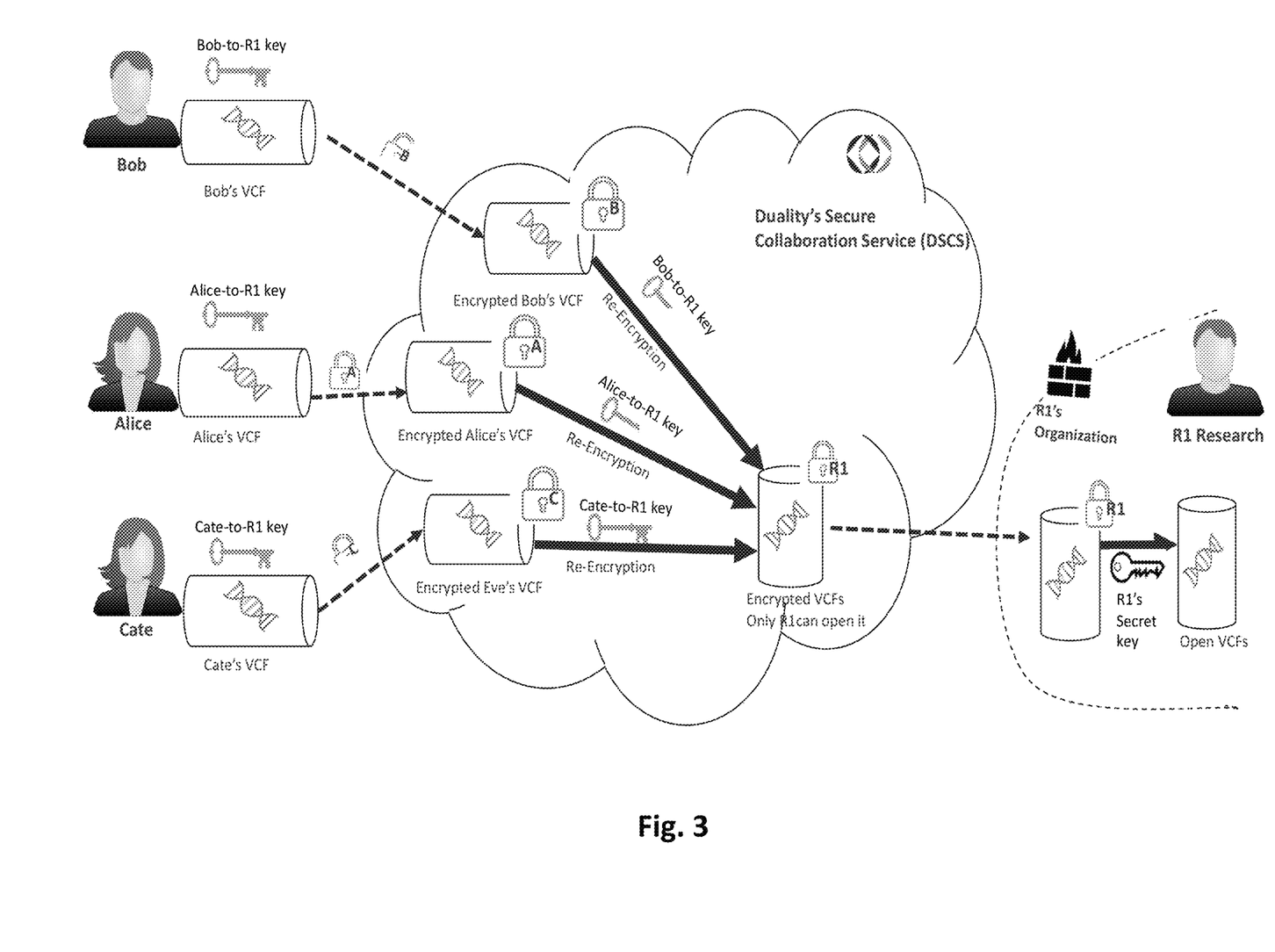
FIGS. 3-5 are schematic illustrations of peer-to-peer networks according to collaboration scenarios A-C, respectively, for managing a distributed proxy re-encryption key ledger, in various embodiments of the invention.

Reference is made to FIG. 3, which is a schematic illustration of a peer-to-peer network according to a collaboration Scenario A for managing a distributed proxy re-encryption key ledger, in an embodiment of the invention. Collaboration Scenario A may operate as follows:
Research group R1 is interested in digital assets e.g., genomes with certain variants.
Participants (e.g., Bob, Alice and Cate) have such genomes and would like to securely contribute their digital assets to research group R1.
Using the cryptographic access delegation scheme, the participants can delegate access to their genomic data to research group R1 and be compensated or recognized for this.
A Secure Collaboration Service (SCS) may execute the access delegation protocol without decrypting the data.
The access delegation protocol may re-encrypt files encrypted with participants' keys into files encrypted with research group RVs key; this may be performed without decrypting the original files.

Figure 4:
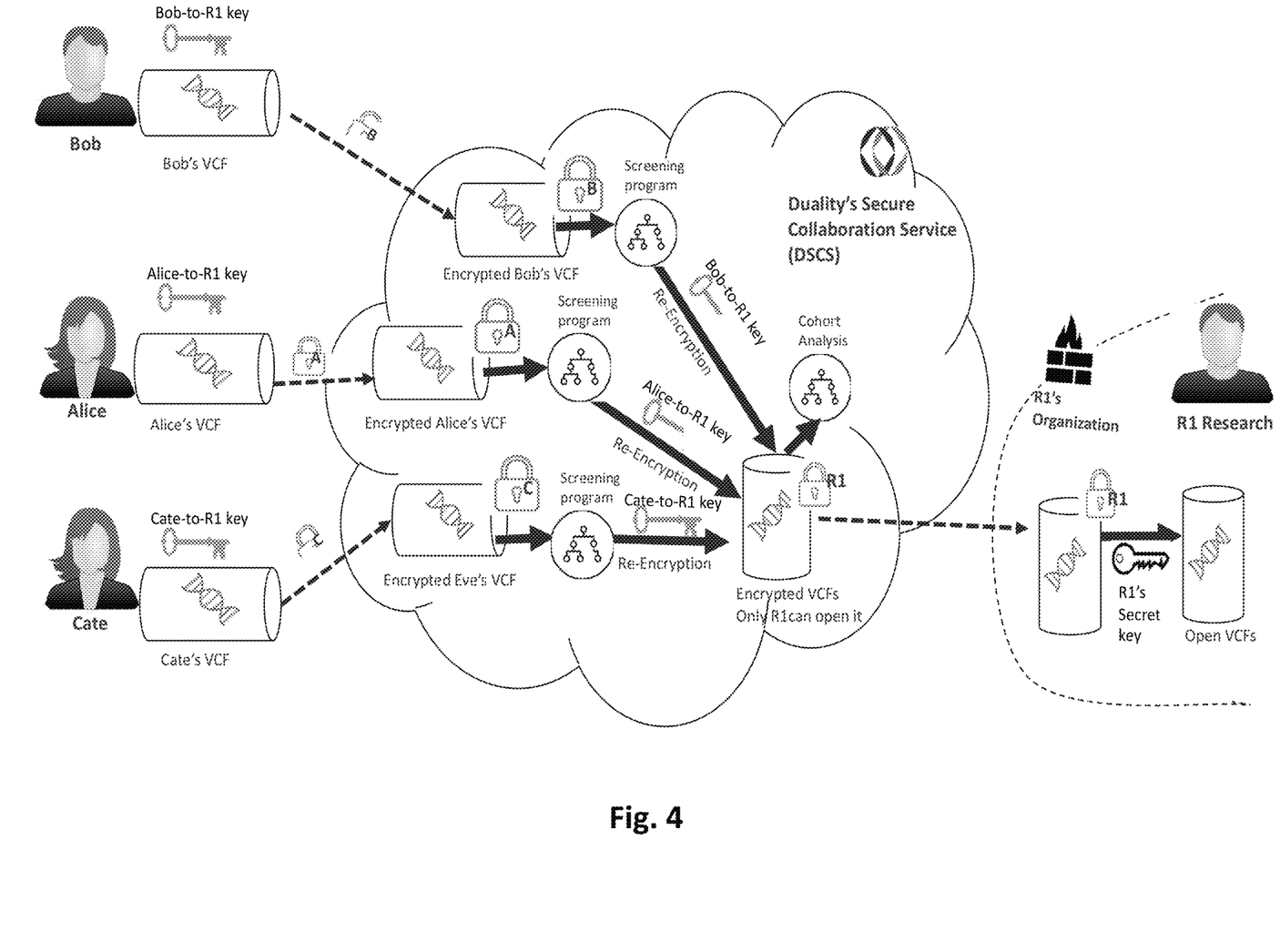
Figure 5:
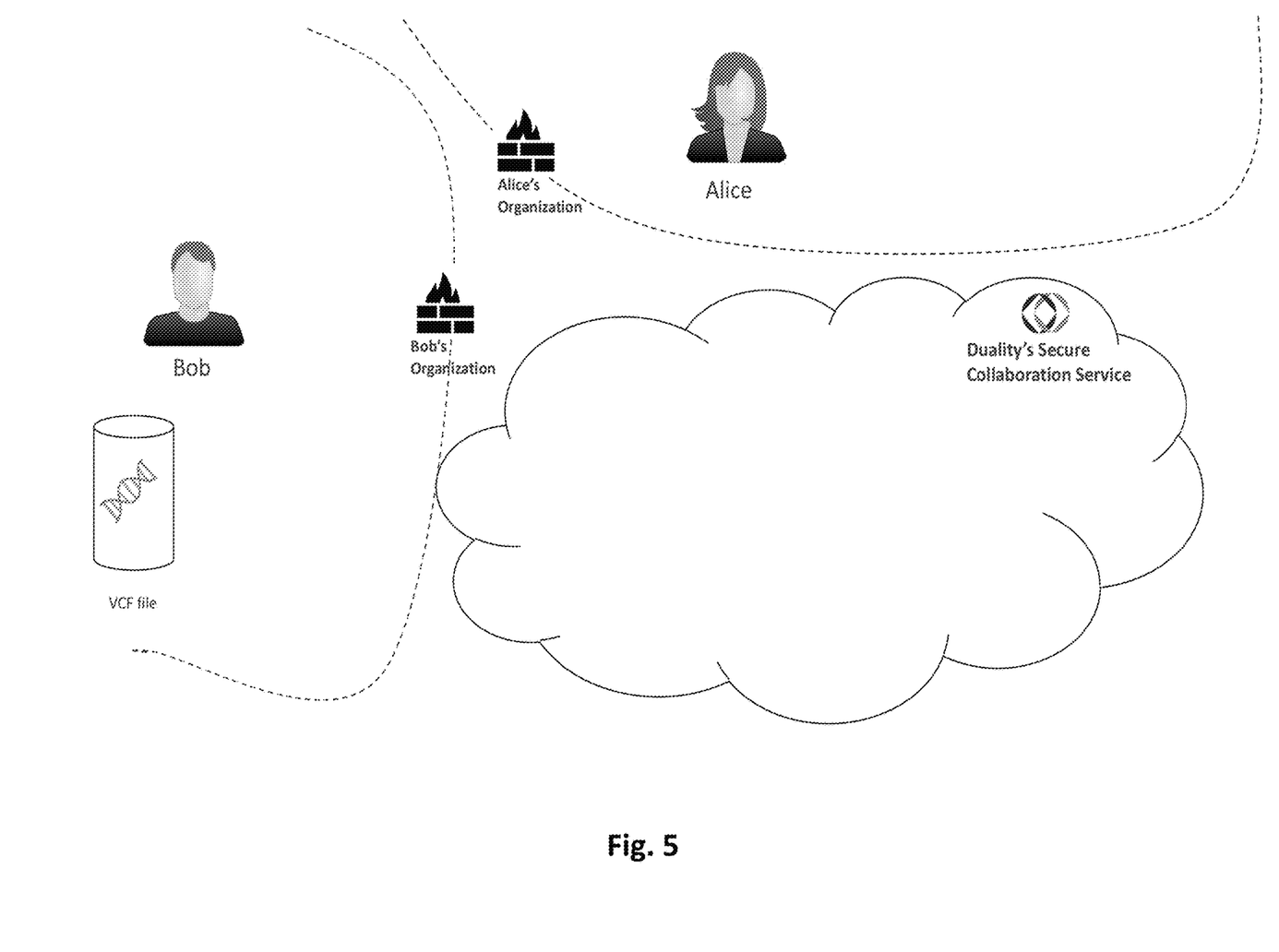

Reference is made to FIG. 4, which is a schematic illustration of a peer-to-peer network according to a collaboration Scenario B for managing a distributed proxy re-encryption key ledger, in an embodiment of the invention. Collaboration Scenario B may operate as follows:
Using a homomorphic encryption (HE) analytics engine, a Secure Collaboration Service (DSCS) executes screening and analysis computations on encrypted data, while the data is stored on a cloud. The analysis computations may include, for example:
screening or validation criteria on contributed data sets;
counting the number of certain variants in a given set of encrypted variant files;
secure linking of variants data with other healthcare data; and/or
Cohort analysis on the aggregated encrypted data sets.
Secure Access Delegation by Proxy Re-encryption. A step-by-step process may proceed, for example, as follows:
Reference is made to FIG. 5, which is a schematic illustration of a peer-to-peer network according to a collaboration Scenario C for managing a distributed proxy re-encryption key ledger, in an embodiment of the invention. Collaboration Scenario C may include the following parties:
A first participant (e.g., Bob) has variant files containing variants of genomes sequenced in his organization. The first participant wishes to securely collaborate on the cloud by delegating access to his variants files to other organizations or devices.

Figure 6:
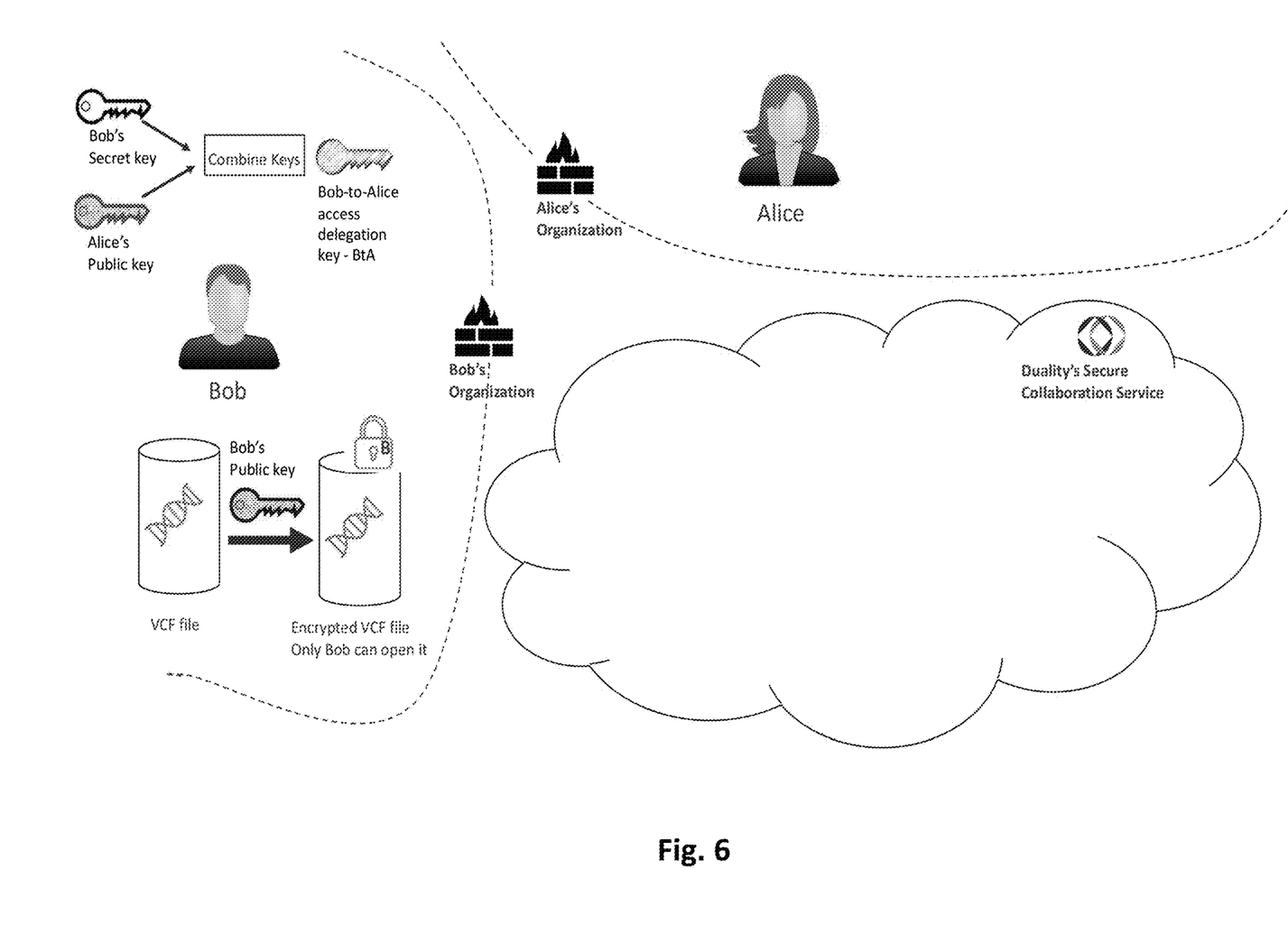
FIGS. 6-8 are schematic illustrations of various stages of operating the collaborative scenario C in the example system of FIG. 5, according to an embodiment of the invention.
Figure 7:
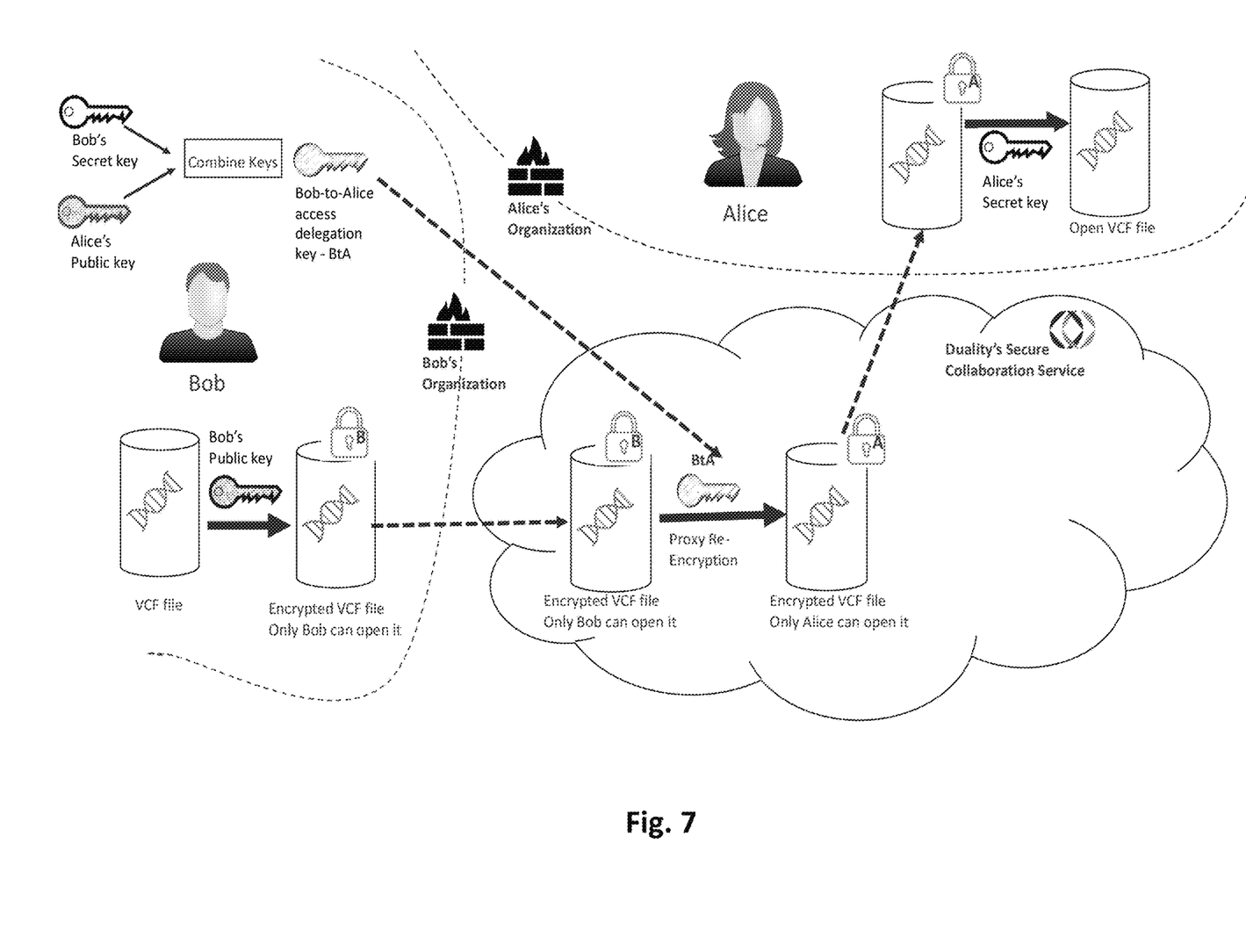
Figure 8:
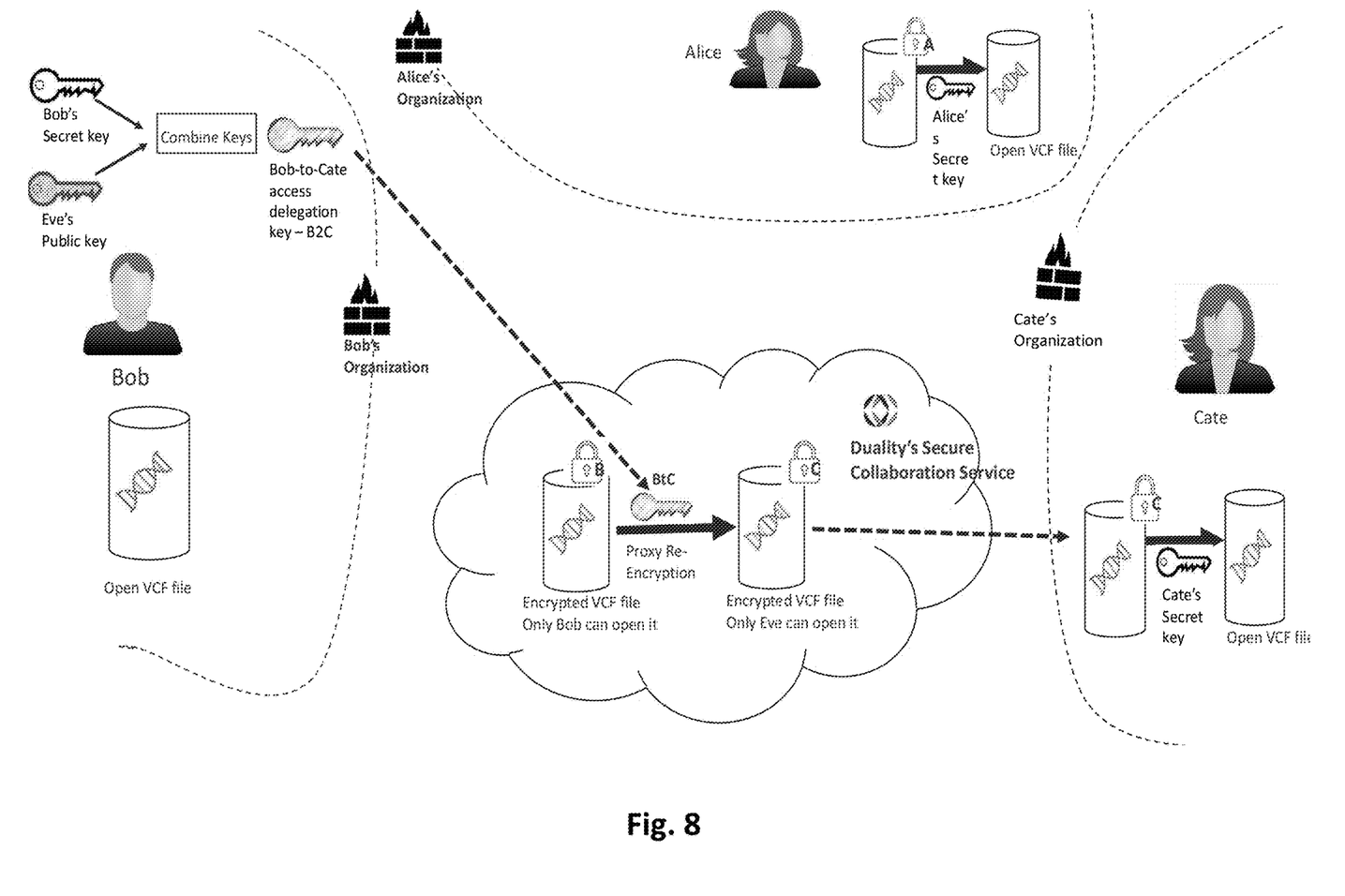

A second participant (e.g., Alice) represents such an organization. Collaboration Scenario C of FIG. 5 may operate as shown in FIGS. 6-8, as follows.

Collaboration Scenario C Stage 1: Reference is made to FIG. 6, which shows a first stage in the collaborative scenario C in the example system of FIG. 5 as follows:

The first participant (e.g., Bob) generates a pair of keys: First Secret key and First Public key.

Using the First Public key, the first participant encrypts his secret data, e.g., first variants files.

Using the First Secret key and a Second Public key assigned to the second participant (e.g., Alice), the first participant may use PRE to generate a First-to-Second participant access delegation key (e.g., a Bob-to-Alice (BtA) key).

Collaboration Scenario C Stage 2: Reference is made to FIG. 7, which shows a second stage in the collaborative scenario C in the example system of FIG. 5 as follows:

The first participant (e.g., Bob) uploads the encrypted variants files to the Secure Collaboration Service on the cloud.

The first participant uploads the First-to-Second participant access delegation key (e.g., Bob-to-Alice (BtA) key to the SCS.

SCS, using the BtA key, re-encrypts the first participant's encrypted variants files resulting in variants files that only the second participant can decrypt. The SCS may thus provide access to the file without ever itself decrypting the file.

Once it is re-encrypted, all of the first participant's files that are encrypted with the first public key can be redirected to the second participant by SCS using the access delegation keys (e.g., BtA key).

Collaboration Scenario C Stage 3: Reference is made to FIG. 8, which shows a third stage in the collaborative scenario C in the example system of FIG. 5 as follows:

Once encrypted and uploaded to the SCS, the first participant (e.g., Bob) can securely delegate access to his encrypted variants files to other members of the collaboration simply by generating the access delegation keys (for example, a Bob-to-Cate (BtC) key to provide file access to Cate).

The SCS may re-encrypt and delegate access to participants as requested without ever decrypting the managed files.

Figure 10:
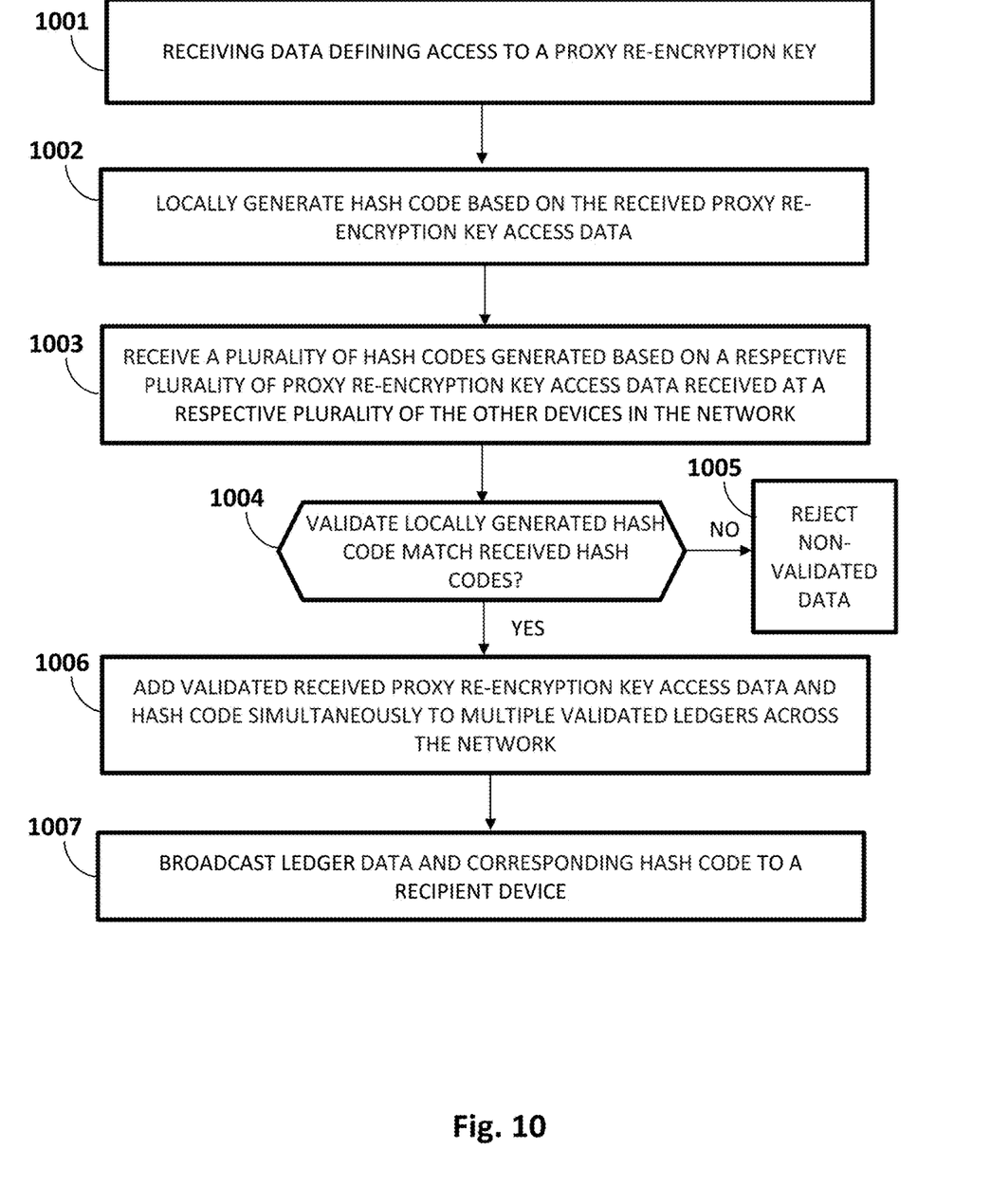
FIG. 10 is a flowchart of a method for a network device to operate in a peer-to-peer network for decentralized management of a distributed proxy re-encryption key ledger, in accordance with some embodiments of the invention.

Reference is made to FIG. 10, which is a flowchart of a method for decentralized management of a distributed proxy re-encryption key ledger by a peer-to-peer network, in accordance with some embodiments of the invention. The method(s) of FIG. 10 may be performed using devices or components disclosed in reference to the systems of FIGS. 1A, 3-8, using the data structures disclosed in reference to FIG. 18 or 2. For example, the method(s) of FIG. 10 may be performed using one or more processors 116 of one or more peer devices 102 of FIG. 1A. Other devices or systems may also be used.

In operation 1001, a network device (e.g., 102 of FIG. 1A) in the distributed peer-to-peer network may receive data defining access to a proxy re-encryption key. The proxy re-encryption key is configured to simultaneously switch encryption keys by adding a second encryption key and cancelling a first encryption key to transform secret data from being encrypted by the first encryption key to being encrypted by the second encryption key, without decrypting the secret data, as described in reference to FIG. 2.

In operation 1002, the network device may locally generate a hash code based on the received proxy re-encryption key access data. The network device may locally generate the hash code based on the received proxy re-encryption key access data and at least one other data previously added to the distributed proxy re-encryption key ledger.

In operation 1003, the network device may receive a plurality of hash codes generated based on a respective plurality of proxy re-encryption key access data received at a respective plurality of the other devices in the network.

In operation 1004, the network device may determine if the locally generated hash code matches the received plurality of hash codes (for all or an above threshold number or proportion of the received plurality of hash codes). If so, the network device may validate that the received proxy re-encryption key access data is the same as each of the plurality of proxy re-encryption key access data and proceed to operation 1006. If not, the network device may proceed to operation 1005.

In operation 1005, if the locally generated hash code does not match the received plurality of hash codes, the network device may reject the received proxy re-encryption key access data.

In operation 1006, the network device may add the received proxy re-encryption key access data and locally generated hash code to the copy of the distributed proxy re-encryption key ledger, e.g., as described in reference to FIG. 1B. The network device may add the data to the local copy of the ledger at substantially the same time as other devices in the network add the same validated data to their local copies of the shared proxy re-encryption key ledger. In various embodiments, the distributed proxy re-encryption key ledger may include data defining user access to proxy re-encryption keys, one or more proxy re-encryption keys, and/or one or more encrypted files. In one embodiment, the proxy re-encryption key ledger may be one or more blockchains, where each blockchain comprises a chain of a plurality of blocks linked by a plurality of hash codes generated by hashing one or more of the linked blocks. The network device may add the validated received proxy re-encryption key access data and locally generated hash code to the end of one of the blockchains.

In operation 1007, in response to receiving a request from a recipient device to access data from the distributed proxy re-encryption key ledger, the network device may broadcast the requested data and corresponding locally generated hash code to the recipient device from the copy of the distributed proxy re-encryption key ledger stored at the network device. In some embodiments, the network device may redundantly broadcast the requested data substantially simultaneously to a plurality of other devices in the network. The broadcast data may be verified at the recipient device if a hash code generated at the recipient device based on the broadcast data matched the broadcast hash code.

Other operations or orders of operations may be used.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for decentralized management of a distributed proxy re-encryption key ledger by multiple devices in a distributed peer-to-peer network, the method comprising:
    at a network device in the distributed peer-to-peer network:
    receiving data defining access to a proxy re-encryption key configured to simultaneously switch encryption keys by adding a second encryption key and cancelling a first encryption key to transform secret data from being encrypted by the first encryption key to being encrypted by the second encryption key, without decrypting the secret data;
    locally generating a hash code based on the received proxy re-encryption key access data;
    receiving a plurality of hash codes generated based on a respective plurality of proxy re-encryption key access data received at a respective plurality of the other devices in the network;
    validating that the received proxy re-encryption key access data is the same as each of the plurality of proxy re-encryption key access data when the locally generated hash code matches all or an above threshold number or proportion of the received plurality of hash codes; and
    upon validating the received proxy re-encryption key access data, adding the received proxy re-encryption key access data and locally generated hash code to a copy of the distributed proxy re-encryption key ledger stored at the network device substantially simultaneously to the plurality of proxy re-encryption key access data and hash codes being redundantly added to a respective plurality of copies of the distributed proxy re-encryption key ledger stored across a respective plurality of the other devices in the network.

2. The method of claim 1, comprising, in response to receiving a request from a recipient device to access data from the distributed proxy re-encryption key ledger, broadcasting the requested data and corresponding locally generated hash code to the recipient device from the copy of the distributed proxy re-encryption key ledger stored at the network device.

3. The method of claim 2, wherein the broadcast data is verified at the recipient device if a hash code generated at the recipient device based on the broadcast data matches the broadcast hash code.

4. The method of claim 2, wherein broadcasting the requested data at the network device occurs substantially simultaneously to a plurality of other devices in the network.

5. The method of claim 1, wherein the distributed proxy re-encryption key ledger comprises data defining user access to proxy re-encryption keys, one or more proxy re-encryption keys, and one or more encrypted files.

6. The method of claim 1, wherein the proxy re-encryption key ledger is one or more blockchains, each blockchain comprising a chain of a plurality of blocks linked by a plurality of hash codes generated by hashing one or more of the linked blocks.

7. The method of claim 6 comprising adding the validated received proxy re-encryption key access data and locally generated hash code to the end of one of the blockchains.

8. The method of claim 1 comprising rejecting the received proxy re-encryption key access data if the locally generated hash code does not match the received plurality of hash codes.

9. The method of claim 1, wherein the locally generated hash code is generated based on the received proxy re-encryption key access data and at least one other data previously added to the distributed proxy re-encryption key ledger.

10. A system for decentralized management of a distributed proxy re-encryption key ledger by multiple devices in a distributed peer-to-peer network, the system comprising:
a network device in the distributed peer-to-peer network, the network device comprising:
one or more memories configured to store a copy of the distributed proxy re-encryption key ledger; and
one or more processors configured to:
receive data defining access to a proxy re-encryption key for simultaneously switching encryption keys by adding a second encryption key and cancelling a first encryption key to transform secret data from being encrypted by the first encryption key to being encrypted by the second encryption key, without decrypting the secret data,
locally generate a hash code based on the received proxy re-encryption key access data,
receive a plurality of hash codes generated based on a respective plurality of proxy re-encryption key access data received at a respective plurality of the other devices in the network,
validate that the received proxy re-encryption key access data is the same as each of the plurality of proxy re-encryption key access data when the locally generated hash code matches all or an above threshold number or proportion of the received plurality of hash codes, and
upon validating the received proxy re-encryption key access data, add the received proxy re-encryption key access data and locally generated hash code to the copy of the distributed proxy re-encryption key ledger stored in the one or more memories substantially simultaneously to the plurality of proxy re-encryption key access data and hash codes being redundantly added to a respective plurality of copies of the distributed proxy re-encryption key ledger stored across a respective plurality of the other devices in the network.

11. The system of claim 10, wherein, in response to receiving a request from a recipient device to access data from the distributed proxy re-encryption key ledger, the one or more processors are configured to broadcast the requested data and corresponding locally generated hash code to the recipient device from the copy of the distributed proxy re-encryption key ledger stored at the network device.

12. The system of claim 11, wherein the broadcast data is verified at the recipient device if a hash code generated at the recipient device based on the broadcast data matches the broadcast hash code.

13. The system of claim 11, wherein the one or more processors are configured to broadcast the requested data substantially simultaneously to a plurality of other devices in the network.

14. The system of claim 10, wherein the distributed proxy re-encryption key ledger comprises data defining user access to proxy re-encryption keys, one or more proxy re-encryption keys, and one or more encrypted files.

15. The system of claim 10, wherein the proxy re-encryption key ledger is one or more blockchains, each blockchain comprising a chain of a plurality of blocks linked by a plurality of hash codes generated by hashing one or more of the linked blocks.

16. The system of claim 15, wherein the one or more processors are configured to add the validated received proxy re-encryption key access data and locally generated hash code to the end of one of the blockchains.

17. The system of claim 10, wherein the one or more processors are configured to reject the received proxy re-encryption key access data if the locally generated hash code does not match the received plurality of hash codes.

18. The system of Cairn 10, wherein the one or more processors are configured to generate the locally generated hash code based on the received proxy re-encryption key access data and at least one other data previously added to the distributed proxy re-encryption key ledger.

* * * * *